United States Patent
Zhang et al.

(10) Patent No.: US 11,137,762 B2
(45) Date of Patent: Oct. 5, 2021

(54) REAL TIME DECISION MAKING FOR AUTONOMOUS DRIVING VEHICLES

(71) Applicant: Baidu USA LLC, Sunnyvale, CA (US)

(72) Inventors: Liangliang Zhang, Sunnyvale, CA (US); Hongyi Sun, Sunnyvale, CA (US); Dong Li, Sunnyvale, CA (US); Jiangtao Hu, Sunnyvale, CA (US); Jinghao Miao, Sunnyvale, CA (US); Jiaming Tao, Sunnyvale, CA (US); Yifei Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 390 days.

(21) Appl. No.: 16/206,572

(22) Filed: Nov. 30, 2018

(65) Prior Publication Data

US 2020/0174472 A1 Jun. 4, 2020

(51) Int. Cl.
| | |
|---|---|
| *G05D 1/00* | (2006.01) |
| *G05D 1/02* | (2020.01) |
| *G06N 3/04* | (2006.01) |
| *G06N 3/08* | (2006.01) |
| *G01C 21/36* | (2006.01) |

(52) U.S. Cl.
CPC ....... *G05D 1/0088* (2013.01); *G01C 21/3667* (2013.01); *G05D 1/0221* (2013.01); *G06N 3/0454* (2013.01); *G06N 3/084* (2013.01); *G05D 1/027* (2013.01); *G05D 1/0231* (2013.01); *G05D 1/0257* (2013.01); *G05D 1/0278* (2013.01); *G05D 2201/0213* (2013.01)

(58) Field of Classification Search
CPC .............................. G06N 3/04; G06N 3/0454
See application file for complete search history.

(56) References Cited

U.S. PATENT DOCUMENTS 10,106,153 B1   10/2018   Xiao
10,466,716 B1 *  11/2019   Su ........................... G06N 3/08
(Continued)

FOREIGN PATENT DOCUMENTS

| JP | 2016052835 A | 4/2016 |
| JP | 2018055141 A | 4/2018 |
| WO | 2018084324 A1 | 5/2018 |

OTHER PUBLICATIONS

Kim, Jihun and Lee, Minho; "Robust Lane Detection Based on Convolutional Neural Network and Random Sample Consensus"; Neural Information Processing, 21st International Conference, ICONIP 2014; pp. 454-461 (Year: 2014).*

(Continued)

*Primary Examiner* — Anshul Sood
(74) *Attorney, Agent, or Firm* — Womble Bond Dickinson LLP

(57) ABSTRACT

In one embodiment, a method, apparatus, and system may predict behavior of environmental objects using machine learning at an autonomous driving vehicle (ADV). One or more yield/overtake decisions are made with respect to one or more objects in the ADV's surrounding environment using a data processing architecture comprising at least a first, a second, and a third neural networks, the first, the second, and the third neural networks having been trained with a training data set. Driving signals are generated based at least in part on the yield/overtake decisions to control operations of the ADV.

23 Claims, 12 Drawing Sheets

(56) References Cited

U.S. PATENT DOCUMENTS

2019/0147335 A1* 5/2019 Wang .................. G06N 3/0454
                                                          706/20
2019/0258251 A1* 8/2019 Ditty .................... G05D 1/0274

OTHER PUBLICATIONS

Hecker Simon et al, "End-to-End Learning of Driving Models with Surround-View Cameras and Route Planners," Oct. 6, 2018, International Conference on Financial Cryptography and Data Security.
Khosroshahi Aida et al, "Surround Vehicles Trajectory Analysis with Recurrent Neural Networks" 2016 IEEE 19th International Conference on Intelligent Transportation Systems, Nov. 1, 2016.
Rajput N S et al, "A Novel Autonomous Taxi Model for Smart Cities," 2018 IEEE 4th World Forum on Internet of Things, Feb. 5, 2018.

* cited by examiner

REAL TIME DECISION MAKING FOR AUTONOMOUS DRIVING VEHICLES

TECHNICAL FIELD

Embodiments of the present disclosure relate generally to operating autonomous vehicles. More particularly, embodiments of the disclosure relate to using machine learning algorithms in decision making in controlling autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Making decisions regarding surrounding objects is one of the key components in the autonomous driving technology. One type of decision to make is the yield/overtake decision with respect to a moving object in the autonomous driving vehicle (ADV)'s surrounding environment whose path intersects the ADV's planned path. The yield/overtake decision is defined based on the intersect time at the crossing point between the object's and the ADV's paths. If the object reaches the crossing point before the ADV, the ADV has "yielded" to the object. On the other hand, if the ADV reaches the crossing point before the object, the ADV has "overtaken" the object.

Making decisions based on machine learning is generally difficult because it requires hand-labeled data for training. It is also time consuming because decisions need to be made with respect to each object in an iterative fashion.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
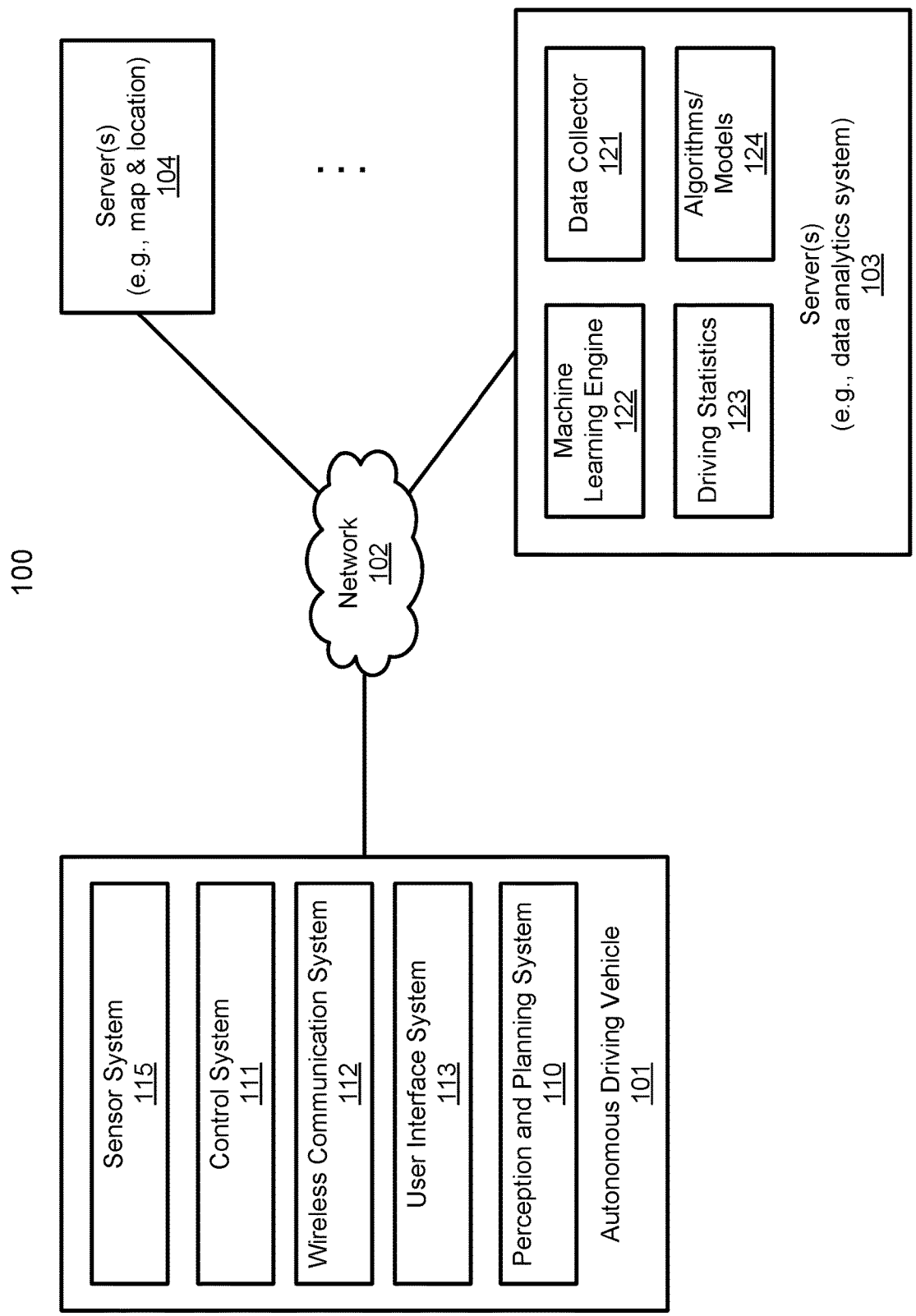
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In one embodiment, a method, apparatus, and system may be provided for making a decision in operating an autonomous driving vehicle (ADV) using machine learning. One or more yield/overtake decisions are made with respect to one or more objects in the ADV's surrounding environment using a data processing architecture comprising at least a first, a second, and a third neural networks, the first, the second, and the third neural networks having been trained with a training data set. Thereafter, driving signals are generated based at least in part on the yield/overtake decisions to control operations of the ADV.

In one embodiment, the one or more objects comprise automobiles, bicycles, and/or pedestrians. The first neural network is a multilayer perceptron; the second neural network is a convolutional neural network (CNN); and the third neural network is a fully-connected network.

In one embodiment, the first neural network receives historical features of the one or more objects from one or more previous planning cycles as inputs, and generates extracted historical features of the one or more objects as outputs; the second neural network receives the extracted historical features of the one or more objects and map information as inputs, and generates data encoding both the extracted historical features of the one or more objects and the map information as outputs; and the third neural network receives the encoded data and historical features of the ADV as inputs, and generates the one or more yield/overtake decisions comprising decisions with respect to each of the one or more objects as outputs.

In one embodiment, the historical features of the one or more objects comprise one or more of: a position, a speed, or an acceleration. The map information is derived from a high-definition map and comprises one or more of: a lane feature component, a traffic signal component, a static object component, or a general map information component.

In one embodiment, the extracted historical features of the one or more objects and the map information are labeled with associated block information based on a grid subdivision of a rectangular perception area of the ADV, the grid subdivision comprising subdividing the rectangular perception area of the ADV into a plurality of uniformly sized rectangular blocks based on a grid.

In one embodiment, the encoded data and the historical features of the ADV are concatenated before being fed into the third neural network. The training data set comprises previously recorded driving and object perception data automatically labeled with yield/overtake decisions.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
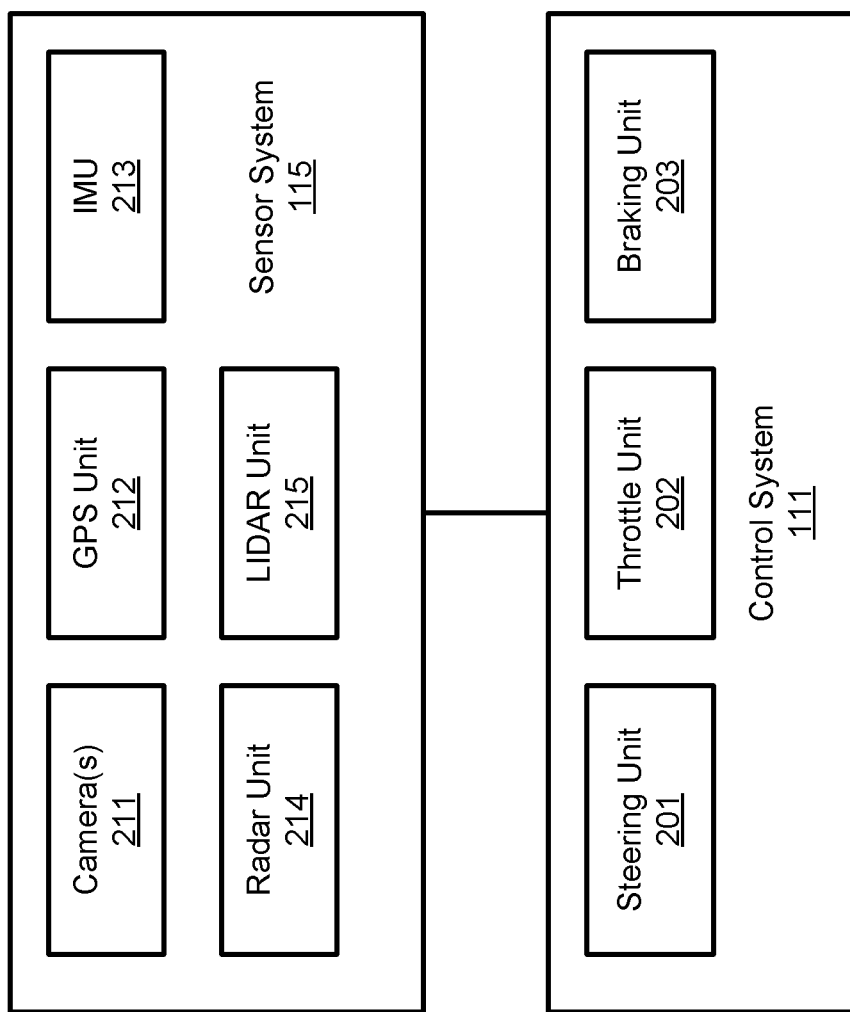
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a neural network-based data processing architecture for making yield/overtake decisions for operating the ADV.

Algorithms 124 can then be uploaded on ADVs to be utilized during autonomous driving in real-time.

Figure 3A:
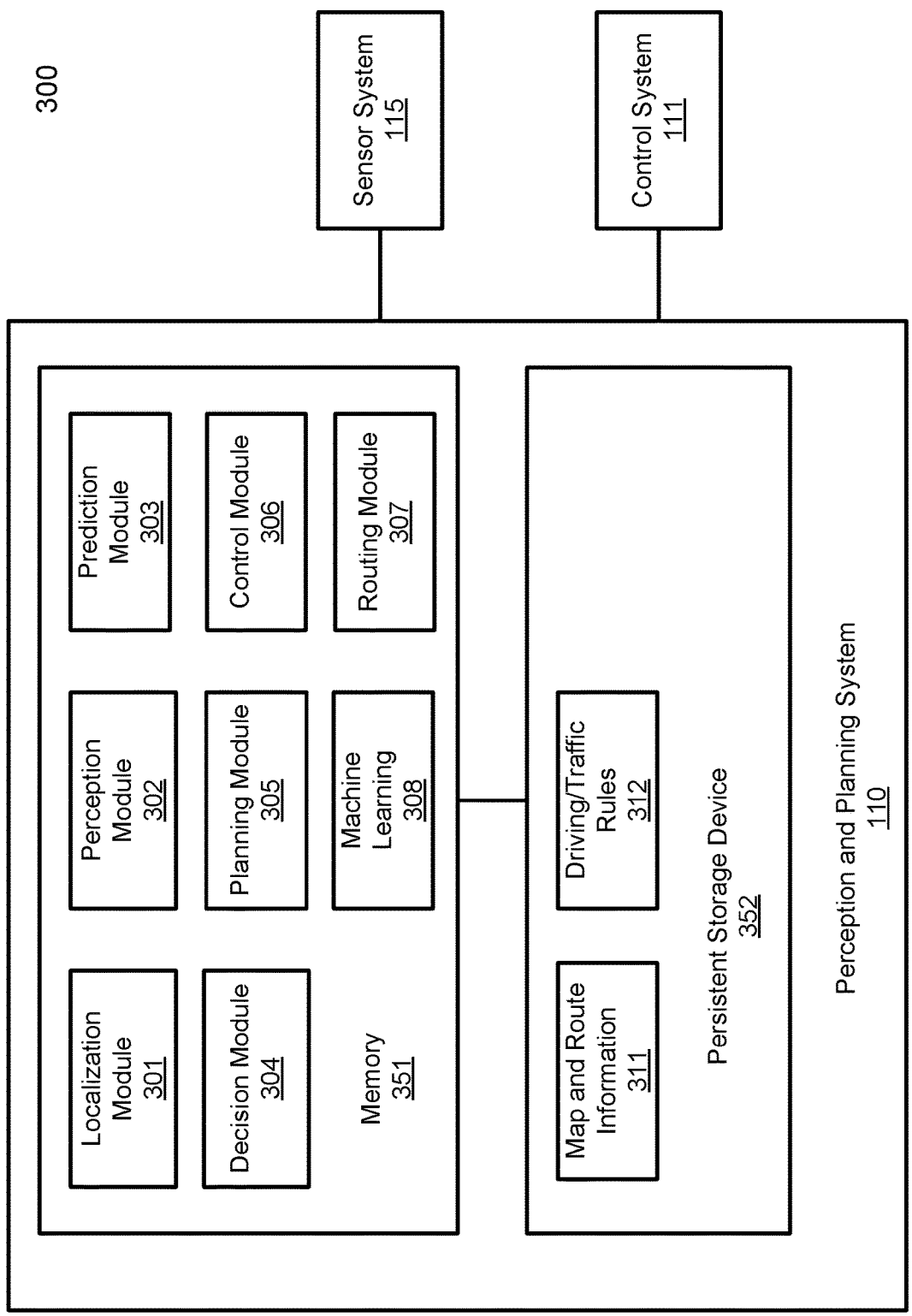
FIGS. 3A-3B are block diagrams illustrating an example of a perception and planning system used with an autonomous vehicle according to one embodiment.
Figure 3B:
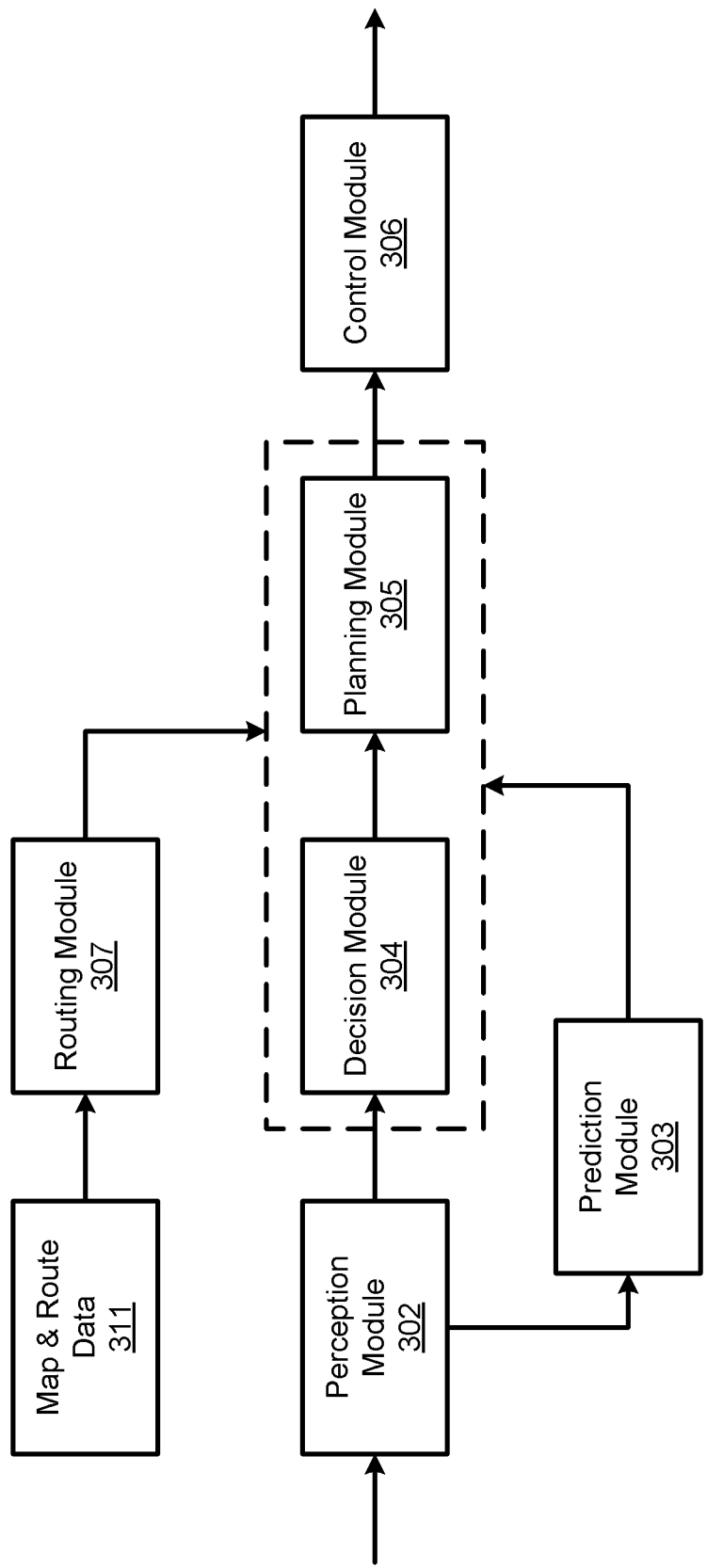

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, machine learning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The machine learning module 308 may implement a data processing architecture with machine learning techniques, such as neural networks or predictive models 313, usable to generate predictions or make decisions based on known data.

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing and decision making in the context of autonomous driving vehicles. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, decision making, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the neural network.

Figure 4:
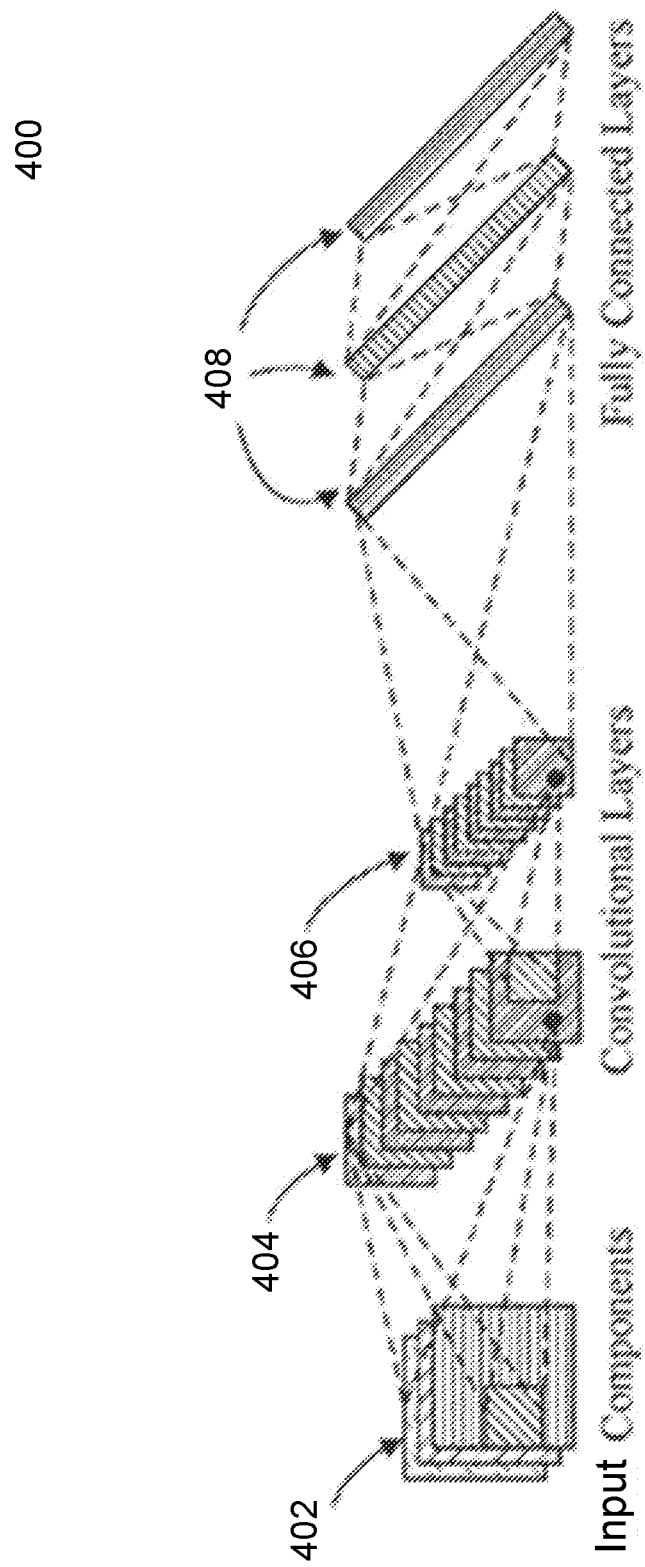
FIG. 4 is a diagram illustrating various layers within a convolutional neural network (CNN) according to one embodiment.

FIG. 4 is a diagram 400 illustrating various layers within a convolutional neural network (CNN) according to one embodiment. The input 402 can comprise a plurality of components. For example, an exemplary CNN used to model image processing can receive input 402 describing the red, green, and blue (RGB) components of an input image. The input 402 can be processed by multiple convolutional layers (e.g., convolutional layer 404, convolutional layer 406). The output from the multiple convolutional layers may optionally be processed by a set of fully connected layers 408. Neurons in a fully connected layer have full connections to all activations in the previous layer, as previously described for a feedforward network. The output from the fully connected layers 408 can be used to generate an output result from the network. The activations within the fully connected layers 408 can be computed using matrix multiplication instead of convolution. Not all CNN implementations make use of fully connected layers 408. For example, in some implementations the convolutional layer 406 can generate output for the CNN.

The convolutional layers are sparsely connected, which differs from traditional neural network configuration found in the fully connected layers 408. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large inputs (e.g., large images).

Figure 5:
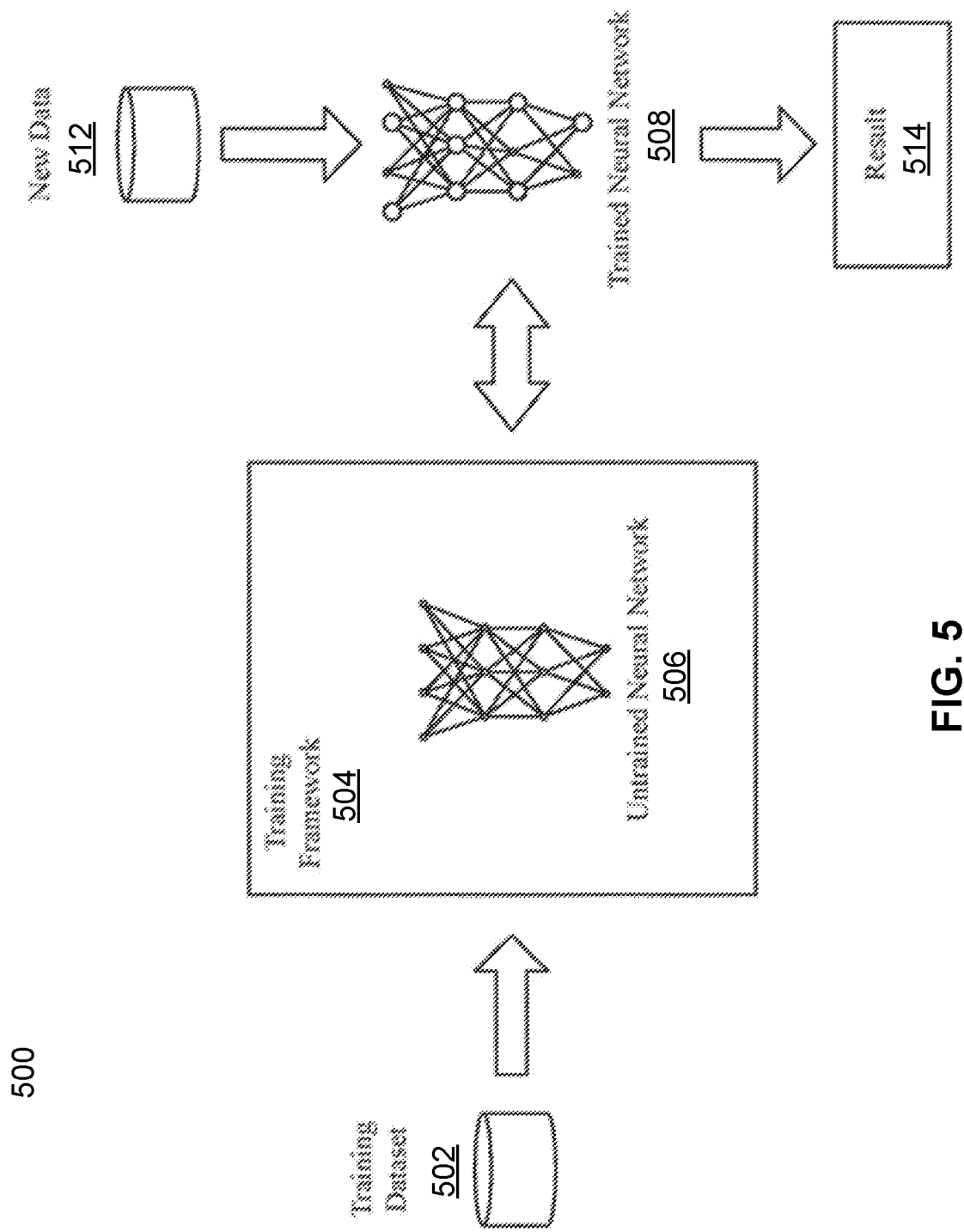
FIG. 5 is a diagram illustrating training and deployment of a deep neural network according to one embodiment.

FIG. 5 is a diagram 500 illustrating training and deployment of a deep neural network according to one embodiment. Once a given network has been structured for a task the neural network is trained using a training dataset 502. Various training frameworks 504 have been developed for the training process. The training framework 504 can hook into an untrained neural network 506 and enable the untrained neural net to be trained to generate a trained neural net 508.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 502 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 504 can adjust the weights that control the untrained neural network 506. The training framework 504 can provide tools to monitor how well the untrained neural network 506 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural net 508. The trained neural network 508 can then be deployed to implement any number of machine learning operations.

Unsupervised learning is a learning method in which the network attempts to train itself using unlabeled data. Thus, for unsupervised learning the training dataset 502 will include input data without any associated output data. The untrained neural network 506 can learn groupings within the unlabeled input and can determine how individual inputs are related to the overall dataset. Unsupervised training can be used to generate a self-organizing map, which is a type of trained neural network 507 capable of performing operations useful in reducing the dimensionality of data. Unsupervised training can also be used to perform anomaly detection, which allows the identification of data points in an input dataset that deviate from the normal patterns of the data.

Figure 6:
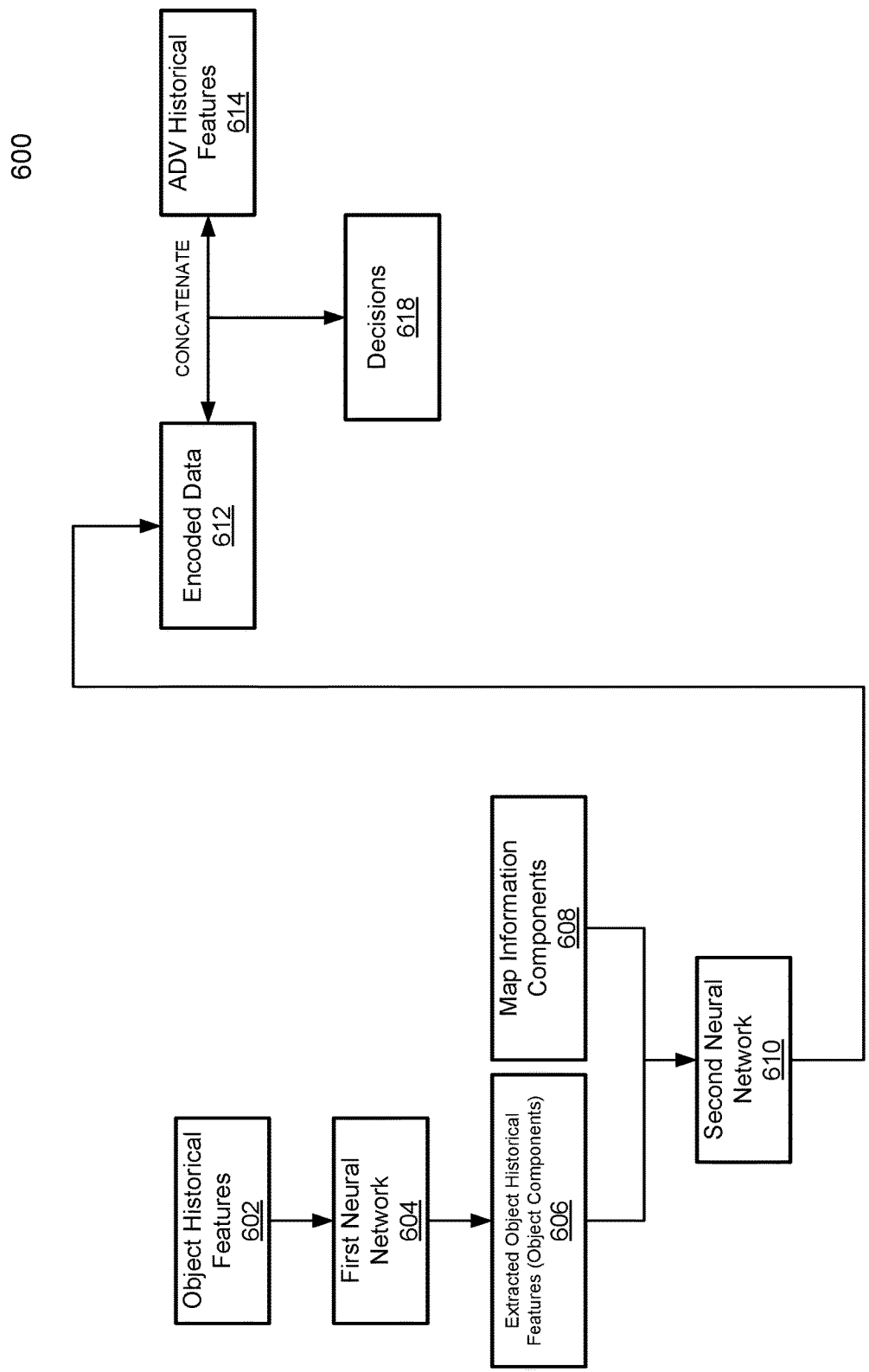
FIG. 6 is a block diagram illustrating a data processing architecture according to one embodiment.

Referring to FIG. 6, a block diagram illustrating a data processing architecture 600 according to one embodiment is shown. Historical features of objects 602 in the perception area detected by the ADV are fed into a first neural network 604. The objects may comprise automobiles, bicycles, pedestrians, etc. The historical features of objects may comprise but are not limited to: a location (e.g., coordinates), a speed (magnitude and direction), an acceleration (magnitude and direction), etc. in a number of previous planning cycles (e.g., 10 previous planning cycles). Before being fed into the first neural network 604, the object historical features may be concatenated together to form an object feature list. The first neural network 604 may be a fully-connected network, such as a multilayer perceptron, that shares the same parameters (weights) for all objects.

The output of the first neural network 604 may be configured to comprise a small number (e.g., 1-3) of extracted object historical features 606, and becomes the object components 606 of the input to a second neural network 610. The object components 606 are fed into the second neural network 610 together with map information components 608. The map information components 608 are generated based on map and route information 311 (e.g., a high-definition map), and may comprise but are not limited to: a lane feature component, a traffic signal component, a static object component, a general map information component, etc. for the perception area.

In one embodiment, the perception area may be a rectangular area, and may be further subdivided into a plurality of equally sized rectangular blocks based on a grid. The perception area may approximately correspond to the perception range of the ADV. For example, the perception area may be 100 meters long and 40 meters wide. The size of the blocks that make up the perception area may be empirically chosen, and in one embodiment, may be chosen so that each block may contain no more than one object at a time. For example, the blocks may be 2 meters by 2 meters.

Before being fed into the second neural network 610, the object components 606 and the map information components 608 may be labeled based on the grid subdivision. In other words, the extracted object historical features and the map information (lanes, traffic signals, static objects, etc.) may be labeled with the blocks with which they are associated. Thus, individual components of the input to the second neural network 610, which comprise object components 606 and map information components 608, as described above, may be visualized as stacked layers that are aligned with each other based on the grid.

The second neural network 610 may be a CNN, and may be configured to output data 612 encoding both the extracted historical features of the one or more objects and the map information. The encoded data 612 can be concatenated with historical features of the ADV 614 (e.g., a position, a speed, an acceleration) from a number of previous planning cycles (e.g., 10 previous planning cycles), before being fed into a third neural network 616. The third neural network 616 then generates one or more yield/overtake decisions 618 for the one or more objects, each object corresponding to one decision.

It should be appreciated that the first, second, and third neural networks 604, 610, 616 need to be trained with a training data set comprising driving (e.g., human driving) and object behavior ground truth data and map information before they can be used to make predictions for ADV operations. Before used for training, the training data set may be automatically labeled with the yield/overtake decisions actually made based on the time instants the subject vehicle and the different objects reach the crossing point (the point where the path of the subject vehicle and the path of a moving object intersect). If an object reaches the crossing point before the subject vehicle, the associated decision is labeled "yield." If the subject vehicle reaches the crossing point before an object, the associated decision is labeled "overtake." If the path of the subject vehicle and the path of an object do not intersect, the associated decision is labeled "unknown."

Figure 7:
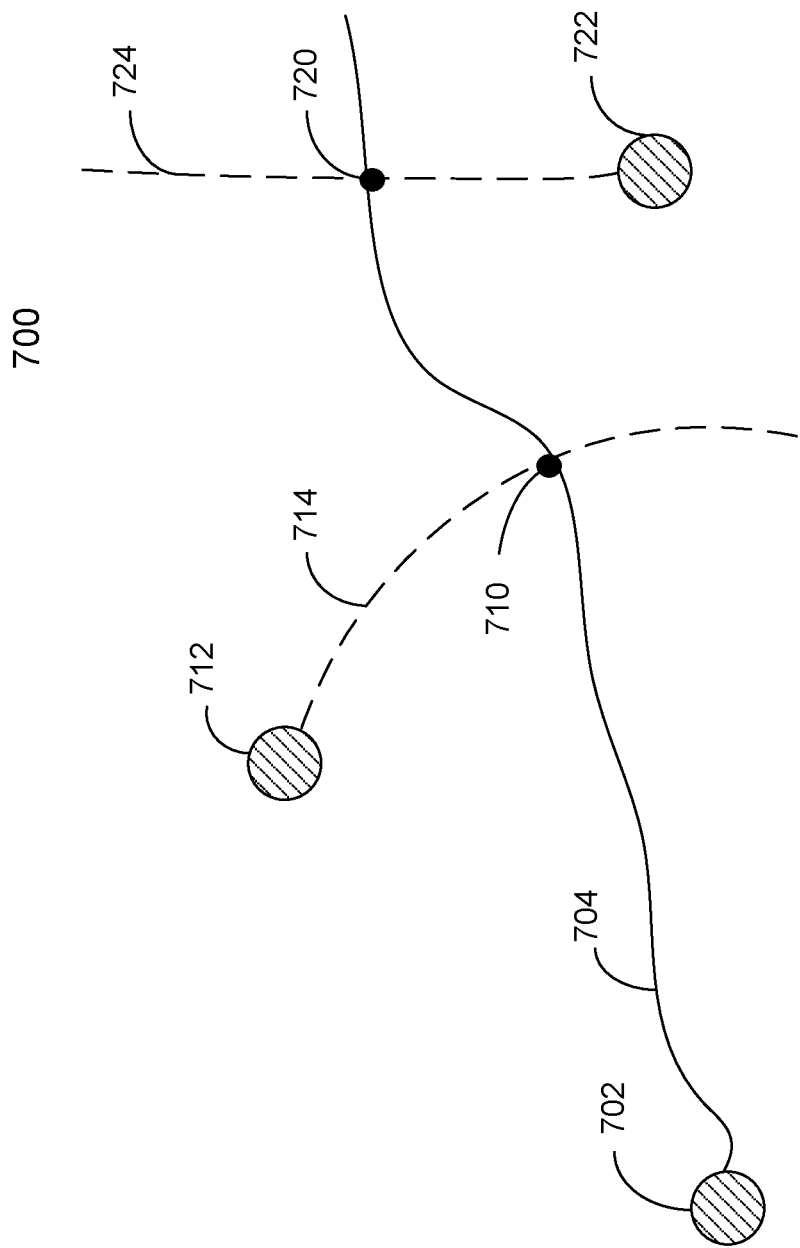
FIG. 7 is a diagram illustrating an example method for automatically labeling training data with yield/overtake decisions according to one embodiment.

Referring to FIG. 7, a diagram 700 illustrating an example method for automatically labeling training data with yield/overtake decisions according to one embodiment is shown. The path 704 of the subject vehicle 702 intersects the path 714 of a first moving object 712 at a crossing point 710, and intersects the path 724 of a second moving object 722 at a crossing point 720. The time instants when the subject vehicle 702 reaches crossing points 710, 720 are compared with time instants when the moving objects 712, 722 reach the respective crossing points. If a moving object reaches the crossing point before the subject vehicle, the associated decision is labeled "yield." If the subject vehicle reaches the crossing point before a moving object, the associated decision is labeled "overtake." If the path of the subject vehicle and the path of a moving object do not intersect, the associated decision is labeled "unknown."

Figure 8A:
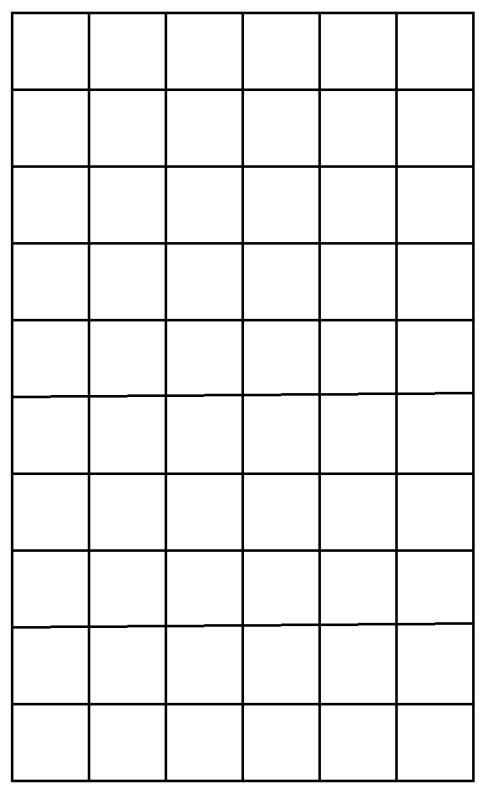
FIGS. 8A and 8B are diagrams illustrating example visual representations of data according to one embodiment.
Figure 8B:
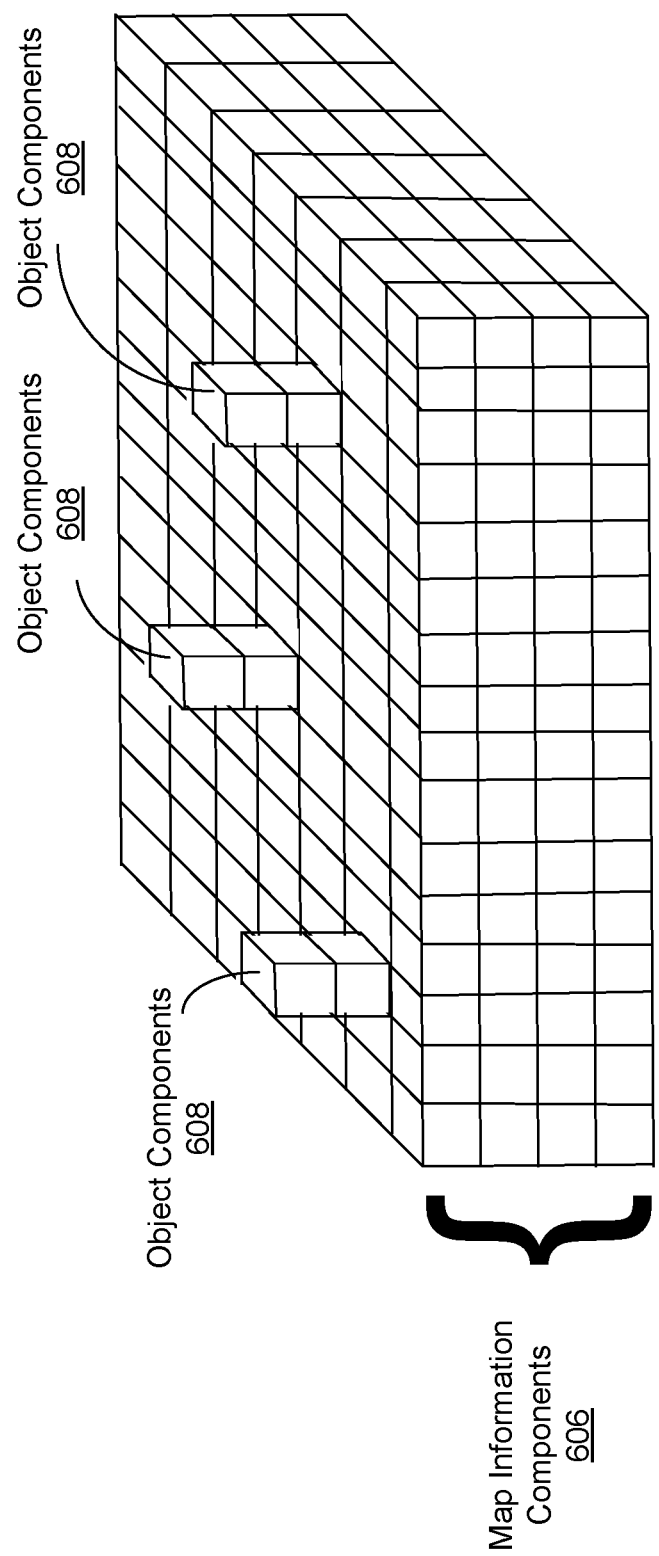

Referring to FIGS. 8A and 8B, diagrams 800A, 800B illustrating example visual representations of data according to one embodiment are shown. It should be appreciated that FIGS. 8A and 8B are for illustrative purposes only, and the numbers of elements shown (e.g., blocks, layers, objects, etc.) do not limit the disclosure. FIG. 8A illustrates a rectangular perception and prediction area 800A of the ADV that is subdivided into equally sized rectangular blocks based on a grid. FIG. 8B illustrates a visualized representation 800B of the map information components 606 and the object components 608 that are fed into the second neural network. As previously described, the map information components 606 and the object components 608 are aligned based on the grid. The map information components (layers) 606 may comprise, e.g., one or more of: a lane feature component (layer), a traffic signal component (layer), a static object component (layer), or a general map information component (layer). It should be appreciated that the object components 608 associated with a same block comprise extracted object historical features related to a same object.

Figure 9:
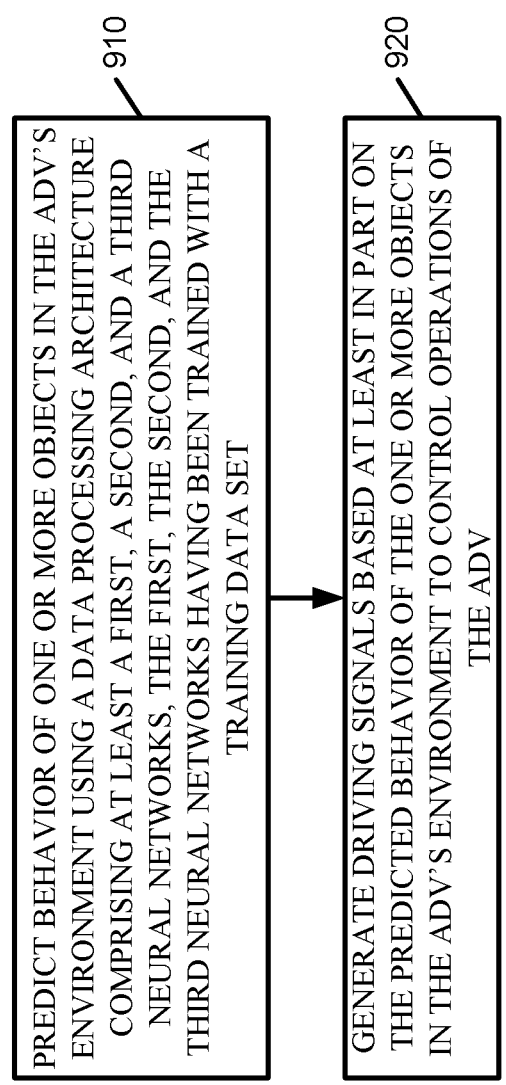
FIG. 9 is a flowchart illustrating an example method for making a decision in autonomous driving vehicle (ADV) operations using machine learning, according to one embodiment.

Referring to FIG. 9, a flowchart illustrating an example method 900 for making a decision in operating an autonomous driving vehicle (ADV) using machine learning, according to one embodiment, is shown. The method 900 may be implemented in hardware, software, or a combination of both (e.g., system 1500 of FIG. 10). At block 910, one or more yield/overtake decisions are made with respect to one or more objects in the ADV's surrounding environment using a data processing architecture comprising at least a first, a second, and a third neural networks, the first, the second, and the third neural networks having been trained with a training data set. At block 920, driving signals are generated based at least in part on the yield/overtake decisions to control operations of the ADV.

In one embodiment, the one or more objects comprise automobiles, bicycles, and/or pedestrians in a perception area of the ADV. The first neural network is a multilayer perceptron. The second neural network is a convolutional neural network (CNN). Further, the third neural network is a fully-connected network.

In one embodiment, the first neural network receives historical features of the one or more objects from one or more previous planning cycles as inputs, and generates extracted historical features of the one or more objects as outputs. The second neural network receives the extracted historical features of the one or more objects and map information as inputs, and generates data encoding both the extracted historical features of the one or more objects and the map information as outputs. Further, the third neural network receives the encoded data and historical features of the ADV as inputs, and generates the one or more yield/overtake decisions comprising decisions with respect to each of the one or more objects as outputs.

In one embodiment, the historical features of the one or more objects comprise one or more of: a position, a speed, or an acceleration, and the map information is derived from a high-definition map and comprises one or more of: a lane feature component, a traffic signal component, a static object component, or a general map information component.

In one embodiment, the extracted historical features of the one or more objects and the map information are labeled with associated block information based on a grid subdivision of a rectangular perception area of the ADV, the grid subdivision comprising subdividing the rectangular perception area of the ADV into a plurality of uniformly sized rectangular blocks based on a grid.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
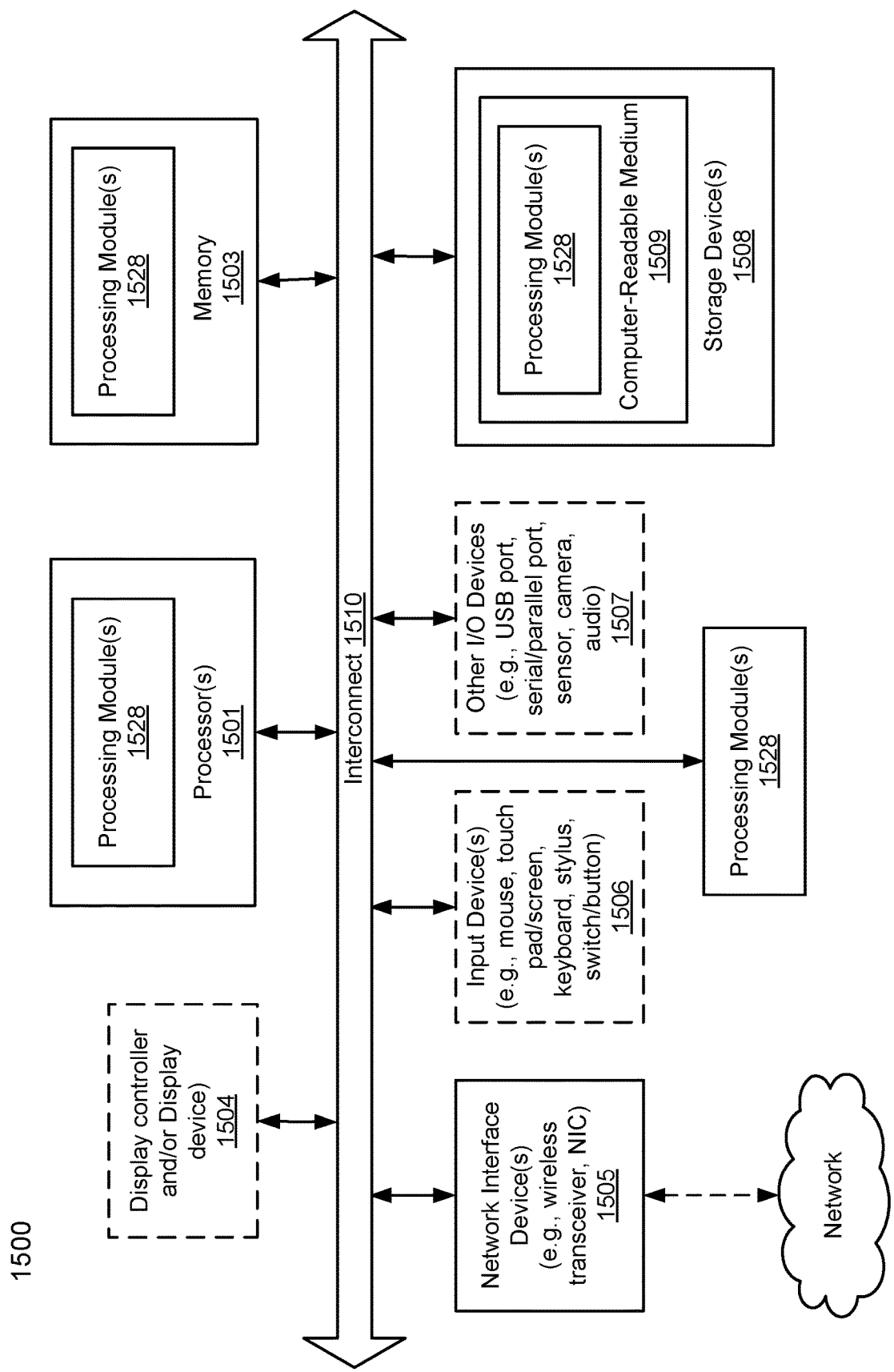
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, machine learning module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for making a decision in operating an autonomous driving vehicle (ADV) using machine learning, comprising:
    making one or more yield/overtake decisions with respect to one or more objects in the ADV's surrounding environment using a data processing architecture comprising at least a first, a second, and a third neural networks, the first, the second, and the third neural networks having been trained with a training data set, wherein the second neural network generates data encoding both extracted historical features of the one or more objects and map information as outputs; and
    generating driving signals based at least in part on the one or more yield/overtake decisions to control operations of the ADV.

2. The method of claim 1, wherein the first neural network is a multilayer perceptron (MLP), wherein the second neural network is a convolutional neural network (CNN), and wherein the third neural network is a fully-connected network.

3. The method of claim 2, wherein the first neural network receives historical features of the one or more objects from one or more previous planning cycles as inputs, and generates the extracted historical features of the one or more objects as outputs.

4. The method of claim 3, wherein the second neural network receives the extracted historical features of the one or more objects and the map information as inputs.

5. The method of claim 4, wherein the third neural network receives the encoded data and historical features of the ADV as inputs, and generates the one or more yield/overtake decisions comprising decisions with respect to each of the one or more objects as outputs.

6. The method of claim 5, wherein the encoded data and the historical features of the ADV are concatenated before being fed into the third neural network.

7. The method of claim 4, wherein the historical features of the one or more objects comprise one or more of: a position, a speed, or an acceleration, and wherein the map information is derived from a high-definition map and comprises one or more of: a lane feature component, a traffic signal component, a static object component, or a general map information component.

8. The method of claim 4, wherein the extracted historical features of the one or more objects and the map information are labeled with associated block information based on a grid subdivision of a rectangular perception area of the ADV, the grid subdivision comprising subdividing the rectangular perception area of the ADV into a plurality of uniformly sized rectangular blocks based on a grid.

9. The method of claim 1, wherein the training data set comprises previously recorded driving and perception data automatically labeled with yield/overtake decisions.

10. A non-transitory machine-readable medium having instructions stored therein, which when executed by a processor, cause the processor to perform operations for making a decision in operating an autonomous driving vehicle (ADV) using machine learning, the operations comprising:
    making one or more yield/overtake decisions with respect to one or more objects in the ADV's surrounding environment using a data processing architecture comprising at least a first, a second, and a third neural networks, the first, the second, and the third neural networks having been trained with a training data set, wherein the second neural network generates data encoding both extracted historical features of the one or more objects and map information as outputs; and generating driving signals based at least in part on the yield/overtake decisions to control operations of the ADV.

11. The non-transitory machine-readable medium of claim 10, wherein the first neural network is a multilayer perceptron, wherein the second neural network is a convolutional neural network (CNN), and wherein the third neural network is a fully-connected network.

12. The non-transitory machine-readable medium of claim 11, wherein the first neural network receives historical features of the one or more objects from one or more previous planning cycles as inputs, and generates the extracted historical features of the one or more objects as outputs.

13. The non-transitory machine-readable medium of claim 12, wherein the second neural network receives the extracted historical features of the one or more objects and the map information as inputs.

14. The non-transitory machine-readable medium of claim 13, wherein the third neural network receives the encoded data and historical features of the ADV as inputs, and generates the one or more yield/overtake decisions comprising decisions with respect to each of the one or more objects as outputs.

15. The non-transitory machine-readable medium of claim 14, wherein the encoded data and the historical features of the ADV are concatenated before being fed into the third neural network.

16. The non-transitory machine-readable medium of claim 13, wherein the historical features of the one or more objects comprise one or more of: a position, a speed, or an acceleration, and wherein the map information is derived from a high-definition map and comprises one or more of: a lane feature component, a traffic signal component, a static object component, or a general map information component.

17. The non-transitory machine-readable medium of claim 13, wherein the extracted historical features of the one or more objects and the map information are labeled with associated block information based on a grid subdivision of a rectangular perception area of the ADV, the grid subdivision comprising subdividing the rectangular perception area of the ADV into a plurality of uniformly sized rectangular blocks based on a grid.

18. The non-transitory machine-readable medium of claim 10, wherein the training data set comprises previously recorded driving and perception data automatically labeled with yield/overtake decisions.

19. A data processing system, comprising:
a processor; and
a memory coupled to the processor to store instructions, which when executed by the processor, cause the processor to perform operations for making a decision in operating an autonomous driving vehicle (ADV) using machine learning, the operations including
making one or more yield/overtake decisions with respect to one or more objects in the ADV's surrounding environment using a data processing architecture comprising at least a first, a second, and a third neural networks, the first, the second, and the third neural networks having been trained with a training data set, wherein the second neural network generates data encoding both extracted historical features of the one or more objects and map information as outputs, and
generating driving signals based at least in part on the yield/overtake decisions to control operations of the ADV.

20. The data processing system of claim 19, wherein the first neural network is a multilayer perceptron, wherein the second neural network is a convolutional neural network (CNN), and wherein the third neural network is a fully-connected network.

21. The data processing system of claim 20, wherein the first neural network receives historical features of the one or more objects from one or more previous planning cycles as inputs, and generates the extracted historical features of the one or more objects as outputs.

22. The data processing system of claim 21, wherein the second neural network receives the extracted historical features of the one or more objects and the map information as inputs.

23. The data processing system of claim 22, wherein the third neural network receives the encoded data and historical features of the ADV as inputs, and generates the one or more yield/overtake decisions comprising decisions with respect to each of the one or more objects as outputs.

* * * * *